US005805701A

United States Patent [19]

Ryan, Jr.

[11] Patent Number: 5,805,701

[45] Date of Patent: Sep. 8, 1998

[54] ENHANCED ENCRYPTION CONTROL SYSTEM FOR A MAIL PROCESSING SYSTEM HAVING DATA CENTER VERIFICATION

[75] Inventor: Frederick W. Ryan, Jr., Oxford, Conn.

[73] Assignee: Pitney Bowes Inc., Stamford, Conn.

[21] Appl. No.: 742,526

[22] Filed: Nov. 1, 1996

[51] Int. Cl.[6] .................... H04L 9/00

[52] U.S. Cl. .................... 380/21

[58] Field of Search .................... 380/21, 23, 49, 380/55

[56] References Cited

U.S. PATENT DOCUMENTS

| | | | |
|---|---|---|---|
| 4,757,532 | 7/1988 | Gilham | 380/21 |
| 4,853,961 | 8/1989 | Pastor | 380/21 |
| 4,893,338 | 1/1990 | Pastor | 380/21 |
| 5,696,829 | 12/1997 | Cordery et al. | 380/21 |

*Primary Examiner*—David Cain

*Attorney, Agent, or Firm*—Charles R. Malandra, Jr.; Melvin J. Scolnick

[57] ABSTRACT

A key control system comprises the generation of a first set of predetermined keys $K_{pred}$ which are then used as master keys for a plurality of respective postage meters. The keys are then related to a respective meter in accordance with a map or algorithm. The predetermined master key $K_{pred}$ is encrypted with the date to yield a date dependent key $K_{dd}$ related to the respective meter. The date dependent key is encrypted with a unique identifier or the respective meter to yield a unique key $K_{final}$ that is by the respective meter to generate digital tokens. The Data Center encrypts the date with each predetermined key $K_{pred}$ to yield a table of dependent keys $K_{dd}$'s. The table of $K_{dd}$'s are distributed to verification sites. The verification site reads a meter's identification from a mailpiece being verified to obtain the dependent key $K_{dd}$ of the meter. The verification site encrypts the dependent key $K_{dd}$ with the unique identifier to obtain the unique meter key which is used to verify tokens generated by the meter. In the preferred embodiment, the master key $K_{pred}$, the date dependent key $K_{dd}$, and the unique key $K_{final}$, in the meter are stored in the meter. In an alternate embodiment, the master key $K_{pred}$ is encrypted with a unique meter identifier to obtain and the unique key $K_{final}$ which is stored in the meter. The meter then generates its date dependent key$_{dd}$, which is used to generate digital tokens.

8 Claims, 6 Drawing Sheets

FIG. 2A

| PED ID | PS-DES POINTER | PS-DES (JULIAN DATE, POSTAGE, PIECE COUNT, PED ID) | VENDOR ECODE | ERROR DETECTION |
|---|---|---|---|---|
| 1234567 | 89 | 01234567890123456789 | 012 | 2 |

FIG. 2B

| PED ID | PS-DES (JULIAN DATE, POSTAGE, PIECE COUNT, PED ID) | VENDOR ECODE | ERROR DETECTION |
|---|---|---|---|
| 1234567 | 01234567890123456789 | 012 | 9 |

FIG. 3A

| PED ID | PS-DES POINTER | JULIAN DATE | POSTAGE | PIECE COUNT | PS ENCODE | VENDOR ECODE | ERROR DETECTION |
|---|---|---|---|---|---|---|---|
| 1234567 | 89 | 01 | .0290 | 678901 | 234 | 567 | 5 |

FIG. 3B

| PED ID | JULIAN DATE | POSTAGE | PIECE COUNT | PS ECODE | VENDOR ECODE | ERROR DETECTION |
|---|---|---|---|---|---|---|
| 1234567 | 01 | .0290 | 678901 | 234 | 567 | 2 |

KEY MANAGEMENT

METER OPERATION

ALTERNATE METER OPERATION

DATA CENTER OPERATION

VERIFICATION

ENHANCED ENCRYPTION CONTROL SYSTEM FOR A MAIL PROCESSING SYSTEM HAVING DATA CENTER VERIFICATION

FIELD OF THE INVENTION

The invention relates to mail processing systems and more particularly to security of postage metering systems.

BACKGROUND OF THE INVENTION

Recent advances in digital printing technology have made it possible to implement digital, i.e., bit map addressable, printing for the purpose of evidencing payment of postage by a postage-meter-like device. Where necessary in order to distinguish such postage-meter-like devices from the typical postage meter, such devices will be called herein Postage Evidencing Devices or PED's. In such devices, the printer may be a typical stand-alone printer. The computer driven printer of such a PED can print the postal indicia in a desired location on the face of a mail piece. Further, as used herein the postal indicia will be defined as the Postal Revenue Block or PRB. The PRB typically contains data such as the postage value, a unique PED identification number, the date and in some applications the name of the place where the mail is originating. It must be noted, however, that the term postage meter as used herein will be understood to cover the various types of postage accounting systems including such PED's and is not to be limited by the type of printer used.

From the Post Office's point of view, it will be appreciated that a serious problem associated with PED's is that the digital printing makes it fairly easy to counterfeit the PRB since any suitable computer and printer may be used to generate multiple images. In fact, many of these new PED systems may be using printers that are able to print legitimate indicia which are indistinguishable from those printed by others that are printed without any attempt to purchase postage.

In order to validate a mailpiece, that is to assure that accounting for the postage amount printed on a mailpiece has been properly done, it is known that one may include as a part of the franking an encrypted number such that, for instance, the value of the franking may be determined from the encryption to learn whether the value as printed on the mailpiece is correct. See, for example, U.S. Pat. Nos. 4,757,537 and 4,775,246 to Edelmann et al. as well as U.S. Pat. No. 4,649,266 to Eckert. It is also known to authenticate a mailpiece by including the address as a further part of the encryption as described in U.S. Pat. No. 4,725,718 to Sansone et al and U.S. Pat. No. 4,743,747 to Fougere et al.

U.S. Pat. No. 5,170,044 to Pastor describes a system wherein include a binary array and the actual arrays of pixels are scanned in order to identify the provider of the mailpiece and to recover other encrypted plaintext information. U.S. Pat. No. 5,142,577 to Pastor describes various alternatives to the DES encoding for encrypting a message and for comparing the decrypted postal information to the plaintext information on the mailpiece.

U.K. 2,251,210A to Gilham describes a meter that contains an electronic calendar to inhibit operation of the franking machine on a periodic basis to ensure that the user conveys accounting information to the postal authorities. U.S. Pat. No. 5,008,827 to Sansone et al. describes a system for updating rates and regulation parameters at each meter via a communication network between the meter and a data center. While the meter is on-line status registers in the meter are checked and an alarm condition raised if an anomaly is detected.

U.S. Pat. No. 5,390,251 to Pastor et al. describes a mail processing system for controlling the validity of printing of indicia on mailpieces from a potentially large number of users of postage meters includes apparatus disposed in each postage meter for generating a code and for printing the code on each mailpiece. The code is an encrypted representation of the postage meter apparatus printing the indicia and other information uniquely determinative of the legitimacy of postage on the mailpieces. The keys for the code generating apparatus are changed at predetermined time intervals in each of the meters. A security center includes apparatus for maintaining a security code database and for keeping track of the keys for generating security codes in correspondence with the changes in each generating apparatus and the information printed on the mailpiece by the postage meter apparatus for comparison with the code printed on the mailpiece. There may be two codes printed, one used by the Postal Service for its security checks and one by the manufacturer. The encryption key may be changed at predetermined intervals or on a daily basis or for printing each mailpiece.

It will be appreciated that in order to verify the information in the PRB using the encrypted message, the verifier must first be able to obtain the key used by the particular meter. In trying to deal with mailing systems which may incorporate such encryption systems, it must be recognized that the meter population is large and subject to constant fluctuation as meters are added and removed from service. If the same key were to be used for all meters, the key distribution is simple but the system is not secure. Once the code is broken by anyone, the key may be made available to others using the system and the entire operation is compromised. However, if separate keys are used respectively for each meter then key management potentially becomes extremely difficult considering the fluctuations in such a large population.

U.S. patent application Ser. No. 08/133,416, filed Oct. 8,1993, and assigned to the assignee of the instant application, describes a key management system for mail processing that assigns one of a set of predetermined keys by a determined relationship to a particular meter, effectively allowing multiple meters to share a single key. The key management system includes the generation of a first set of keys which are then used for a plurality of respective postage meters. A first key of the first set of key is then related to a specific meter in accordance with a map or algorithm. The first key may be changed by entering a second key via an encryption using the first key.

SUMMARY OF THE INVENTION

It has been found that although the system described in U.S. patent application Ser. No. 08/133,416, previously noted and hereafter referred to a the "1000 key system", provides a manageable key management system, the system has multiple meters sharing the same key.

It is therefore an object of the invention to provide a key management system which provides the improved security 1000 key system and yet which will allow ease of key management in a very large system.

It is another object to provide a method for easily changing the keys for each meter in a manner that provides improved security and system wide tracking of the key changes.

In accordance with the present invention, a key control system comprises the generation of a first set of predetermined keys $K_{pred}$ which are then used as master keys for a plurality of respective postage meters. The keys are then related to a respective meter in accordance with a map or algorithm. The predetermined master key $K_{pred}$ is encrypted with the date to yield a date dependent key $K_{dd}$ related to the respective meter. The date dependent key is encrypted with a unique identifier of the respective meter to yield a unique key $K_{final}$ that is used by the respective meter to generate digital tokens. The Data Center encrypts the date with each predetermined key $K_{pred}$ to yield a table of dependent keys $K_{dd}$'s. The table of $K_{dd}$'s are distributed to verification sites. The verification site reads a meter's identification from a mailpiece being verified to look up the dependent key $K_{dd}$ of the meter from the distributed table. The verification site encrypts the dependent key $K_{dd}$ with the unique identifier to obtain the unique meter key which is used to verify tokens generated by the meter.

In a preferred embodiment, the method in accordance with the invention further comprises the steps of storing the master key $K_{pred}$, the date dependent key $K_{dd}$, and the unique key $K_{final}$, in the meter.

In an alternate embodiment, the master key $K_{pred}$ is encrypted with a unique meter identifier to obtain the unique key $K_{final}$ which is stored in the meter. The meter then generates its date dependent key $K_{dd}$, which is used to generate digital tokens.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIGS. 2*a* and 2*b* illustrates the information which may be printed in a first embodiment of a PRB in accordance with the invention;

FIGS. 3*a* and 3*b* illustrate an alternative to the information shown in FIG. 2*a* and 2*b;*

DESCRIPTION OF THE PREFERRED EMBODIMENT

Figure 1:
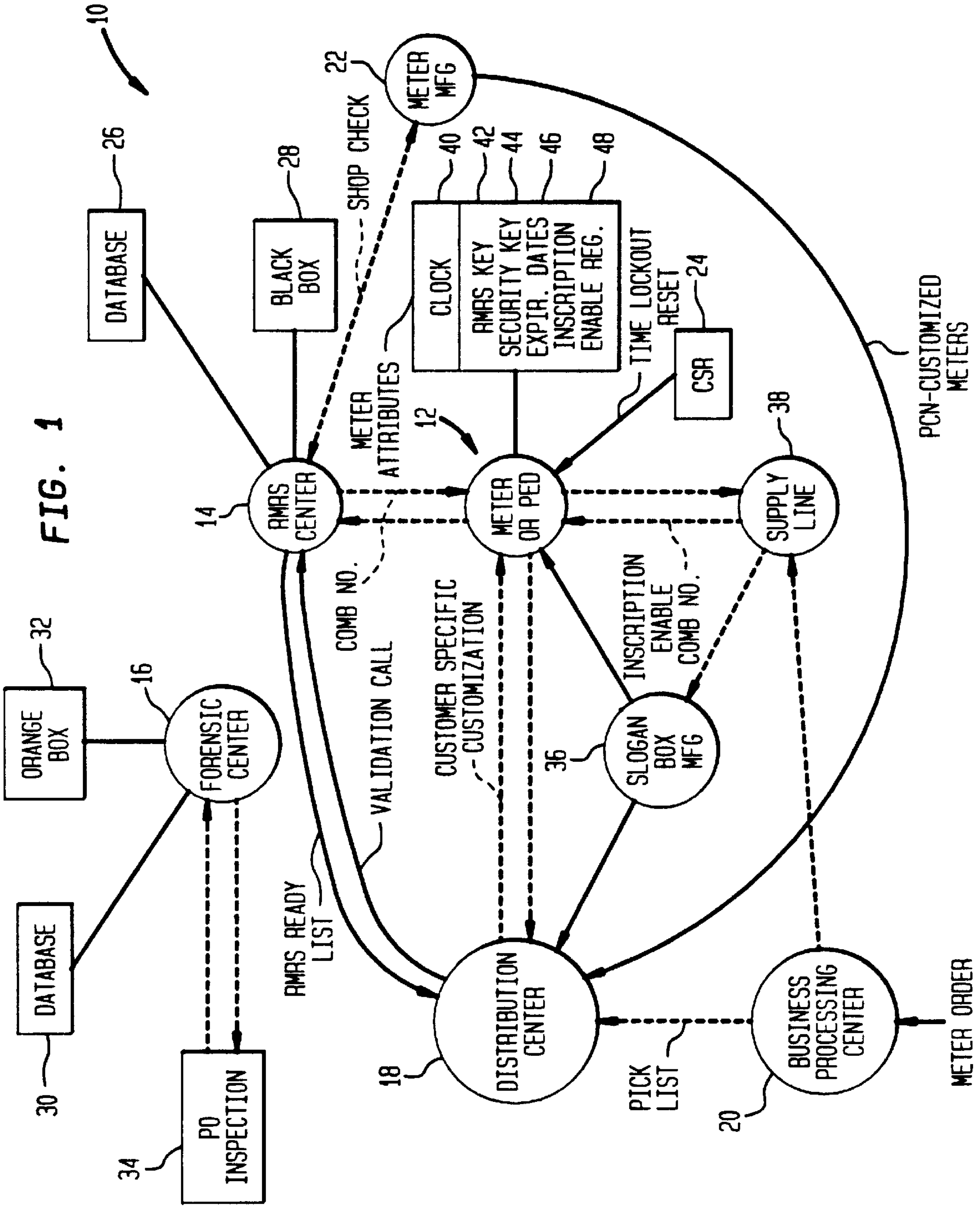
FIG. 1. is a schematic view of a system which may be used in accordance with the invention.

In FIG. 1, there is shown generally at 10 an overall system in accordance with the invention. In the embodiment illustrated, the system comprises a meter or PED 12 interacting with a plurality of different centers. A first center is a well-known meter-fund resetting center 14 of a type described, for example, in U.S. Pat. No. 4,097,923 which is suitable for remotely adding funds to the meter to enable it to continue the operation of dispensing value bearing indicia. In accordance with the invention there is also established a security or forensic center 16 which may of course be physically located at the resetting center 14 but is shown here separately for ease of understanding. Alternatively, such a security or forensic center could be an entirely separate facility maintained by the Postal Authorities, for instance, or two separate facilities may be maintained in order to provide levels of security, if desired. The dashed lines in FIG. 1 indicate telecommunication between the meter 12 and the resetting center 14 (and/or forensic center 16).

Typically, there may be an associated meter distribution center 18 which is utilized to simplify the logistics of placing meters with respective users. Similarly, a business processing center 20 is utilized for the purpose of processing orders for meters and for administration of the various tasks relating to the meter population as a whole.

The meter manufacturer indicated at 22 provides customized meters or PED's to the distribution center 18 after establishing operability with shop checks between the manufacturer and the resetting center 14 and forensic center 16. The meter or PED is unlocked at the user's facility by a customer service representative indicated here by the box 24.

At the resetting center 14 a database 26 relating to meters and meter transactions is maintained. The resetting combinations are generated by a secured apparatus labeled here as the Black Box 28. The details of such a resetting arrangement are found in U.S. Pat. No. 4,097,923, herewith specifically incorporated by reference herein, and will not be further described here.

Database 30 and a secured encryption generating apparatus, designated here as Orange Box 32, are maintained at the security or forensic center 16. The orange box preferably uses the DES standard encryption techniques to provide a coded output based on the keys and other information in the message string provided to it. It will be understood that other encryption arrangements are known and the invention is not limited to the specific embodiment using DES encryption. The security or forensic center 16, wherever maintained, is preferably connected by telecommunication with any Post Office inspection station, one of which is indicated here at 34.

Further details are to be found in U.S. application Ser. No. 08/133,416, filed Oct. 8, 1993, previously noted, and specifically incorporated by reference herein.

Meter 12, as illustrated, includes a secure clock 40 that is used to provide a calendar function programmed by the manufacturer. The clock and calendar function cannot be modified by the user. Such clocks are well known and may be implemented in computer routines or in dedicated chips which provide programmable calendar outputs. Also stored within the registers of the meter 12 are a fund resetting key 42, security key 44, expiration dates 46 and preferably, an inscription enable flag 48. Preferably, in order to prevent the breaking of the encrypted messages to be printed by the postage meter, the security key 44 is changed at predetermined intervals as discussed below.

The security key 44 is used in conjunction with a DES encrypter in the meter 12 to provide an encryption of certain information in the PRB for each printing of the PRB on a mailpiece. At each printing operation, the entire encrypted message may be printed on the mailpiece. However, preferably the cipher, hereafter referred to herein as an ECODE (also referred to as a digital token) is a truncated ciphertext produced by DES encryption of the message based on postage information available to the meter. Verification at the security center consists of verifying that the encrypted information is consistent with the ECODE.

If automatic checking of the ECODE is desired, both the ECODE and the plaintext must be machine readable. A typical length of plaintext information is, for example only and not by way of limitation, the sum of the meter ID (typically 7 digits), a date (preferably 2 digits, suitably the last 2 of the number of days from a predetermined starting date such as January 1), the postage amount (4 digits), and the piece count for a typical total of 16 digits. Reading devices for lifting the information either from a bar-code on the mailpiece or as OCR are well-known and will not be further discussed.

A DES block is conventionally 64-bits long, or approximately 20 decimal digits. A cipher block is an encryption of 64 bits of data. It will be appreciated that other information may be selected and that less than the information provided here may be encrypted in other embodiments of the invention. It is however important to note that the information to be encrypted must be identical to that used in verification. To this end the plaintext message may include data which indicates the particular information which is encrypted. This may take the form of an additional character, additional bar coding or a marking on the mailpiece as may be found desirable.

If desired, a second ECODE could be printed using a DES key from a set of keys PS-DES known to the Postal Service. Alternatively the Postal Service could elect to manage its own set of keys as described in connection with the key management system described below.

In a first embodiment, as shown in FIGS. 2*a* and 2*b*, the plaintext is encrypted using one of the keys from PS-DES. The Postal Service uses the same key from the set PS-DES to verify the message. A higher level of security is provided by the second ECODE.

In a second embodiment, two ECODEs are generated and printed on the mailpiece, one using a PS-DES key provided by the Post Service and the other using a Vendor-DES key provided, for example, by the manufacturer or security center. The Postal Service can then verify the message using its own code generating and key management system while the vendor can separately verify the validity of the message using the ECODE generated using its separate key system. FIGS. 3*a* and 3*b* show the format of this second embodiment.

Figure 4:
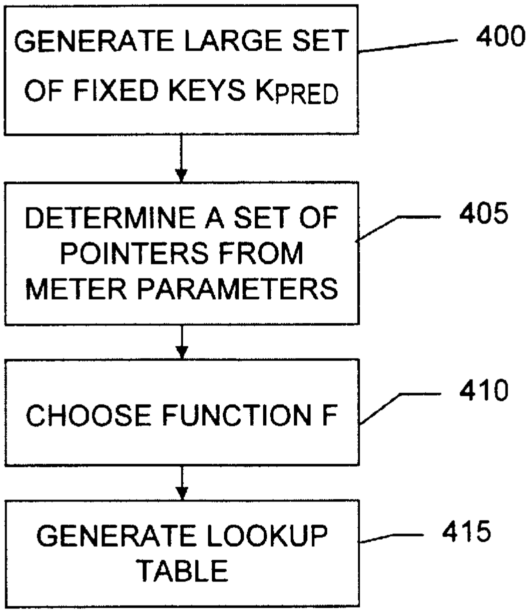
FIG. 4 is a flow chart of the operation for providing keys in accordance with the invention.

FIG. 4 shows an arrangement for managing meter master keys as disclosed in U.S. patent application Ser. No. 08/133,416, previously noted. First a large, fixed set of predetermined keys $K_{pred}$'s is generated, at step 400. As seen below, the system S in accordance with the invention comprises a set of pointers {p}, a set of keys indexed by the pointer {keyp} and a map F or generating algorithm from the set of meter ID's {M} to the set of pointers. Thus:

S=(F, {p}, keyp}) is the system

F: {M}→{p} and

F(M)=F(meter ID)=p finds the pointer to the key for a given meter M.

Thus, returning to FIG. 4, as an example, the set of pointers {p} which may be the integers from 1 to 1000, are created from meter parameters, at step 405. The function F may be then chosen as, again for example, the DES encryption of meter ID using a DES key K, preferably truncated to three digits, at step 410 and a look-up table is generated, at step 415. It will be understood that other functional relationships may be chosen. The look-up table comprises a set of meter ID's and their assigned pointers. For the greatest security, it will be appreciated that the relationship between a pointer p and the corresponding key should not be easily discoverable nor should the relationship between the pointer and the meter ID. It will also be understood that the function F should be maintained in secret.

Figure 5:
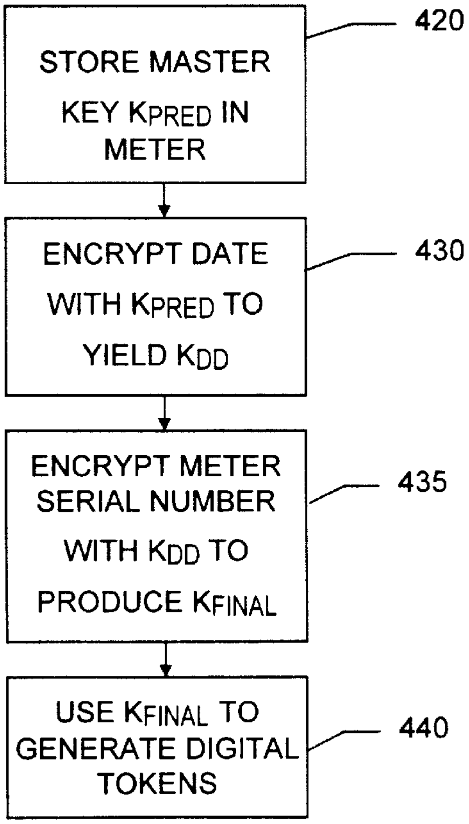
FIG. 5 is a flow chart of meter operation in accordance with the preferred embodiment of the present invention.
Figure 9:
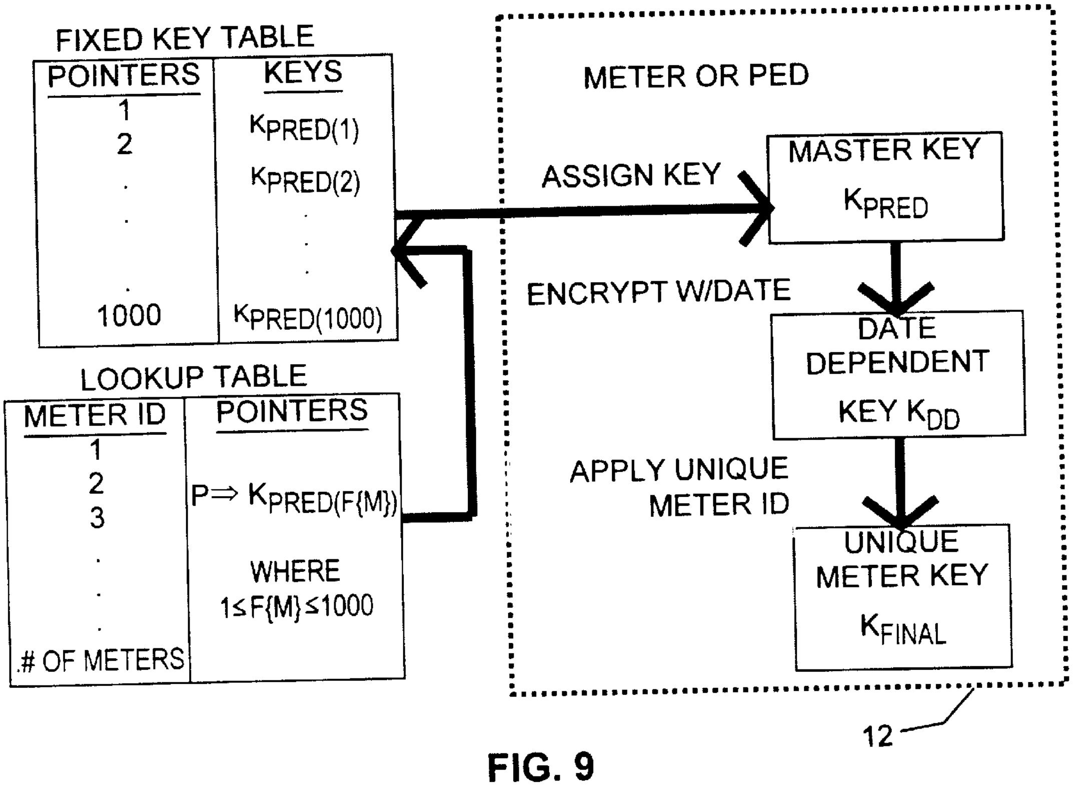
FIG. 9 is a block diagram of the preferred embodiment of the present invention.

Referring now to FIGS. 5 and 9, the preferred embodiment of the present invention is shown. At step 420, using the meter ID of a specific meter in the look-up table, the corresponding $K_{pred}$ is stored in the meter. At step 430, a date dependent key $K_{dd}$ is generated from the predetermined key $K_{pred}$ by encrypting the date with $K_{pred}$ to yield the $K_{dd}$ for the meter. At step 435, a unique meter identifier, such as a meter serial number, is encrypted with the date dependent key $K_{dd}$ to produce a unique key $K_{final}$ for the meter. The meter generates digital tokens using its unique key $K_{final}$.

Figure 6:
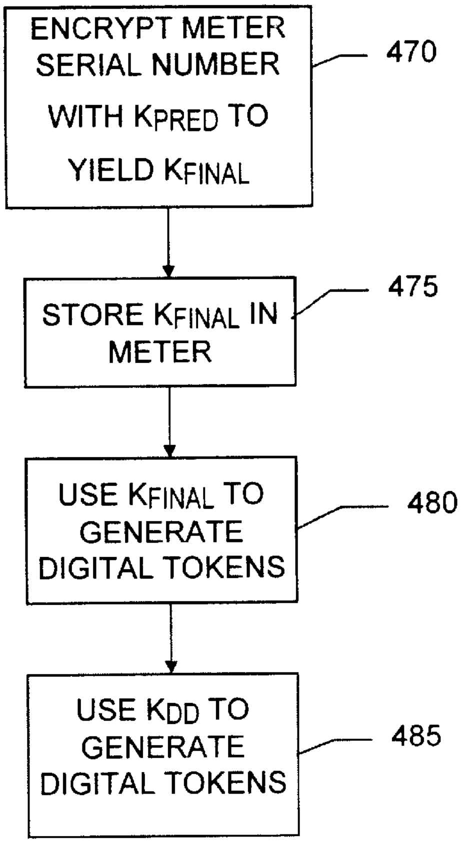
FIG. 6 is a flow chart of meter operation in accordance with an alternate embodiment of the present invention.
Figure 10:
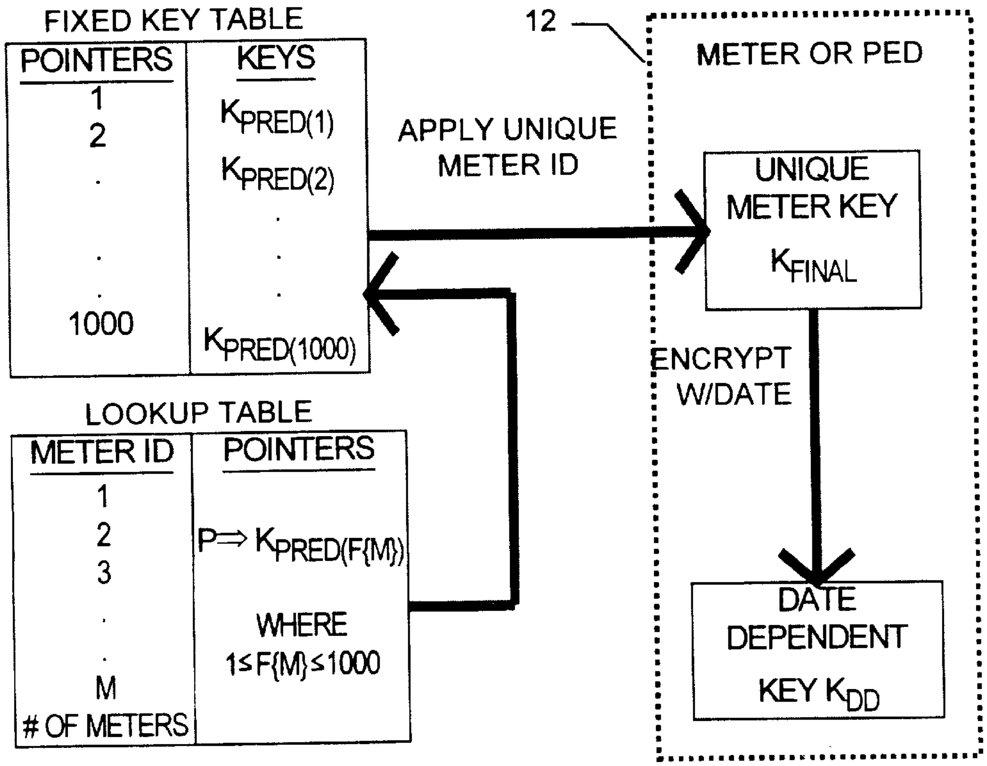
FIG. 10 is a block diagram of an alternate embodiment of the present invention.

Referring now to FIGS. 6 and 10, an alternate embodiment of the meter operation is shown. At step 470, a unique meter identifier, such as a meter serial number, is encrypted with the predetermined master key $K_{pred}$ to yield a unique key $K_{final}$ for the meter. The unique meter key $K_{final}$ is stored in the meter at step 475. $K_{final}$ is used to generate a date dependent key $K_{dd}$ in the meter by encrypting the date with $K_{final}$ to produce date dependent key $K_{dd}$.

Figure 7:
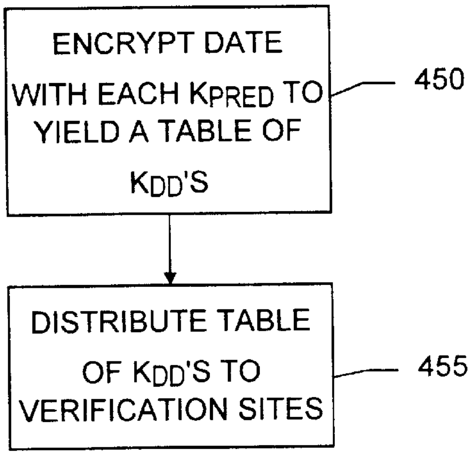
FIG. 7 is a flow chart of data center operation in accordance with the preferred embodiment of the present invention.

Referring now to FIG. 7, the data center operation for the preferred embodiment is shown. At step 450, the date is encrypted with each predetermined master key $K_{pred}$ to yield a table of date dependent keys $K_{dd}$'s. At step 455, the data center distributes the table of $K_{dd}$'s to each of the verification sites for use in verifying digital tokens generated by the meters.

Figure 8:
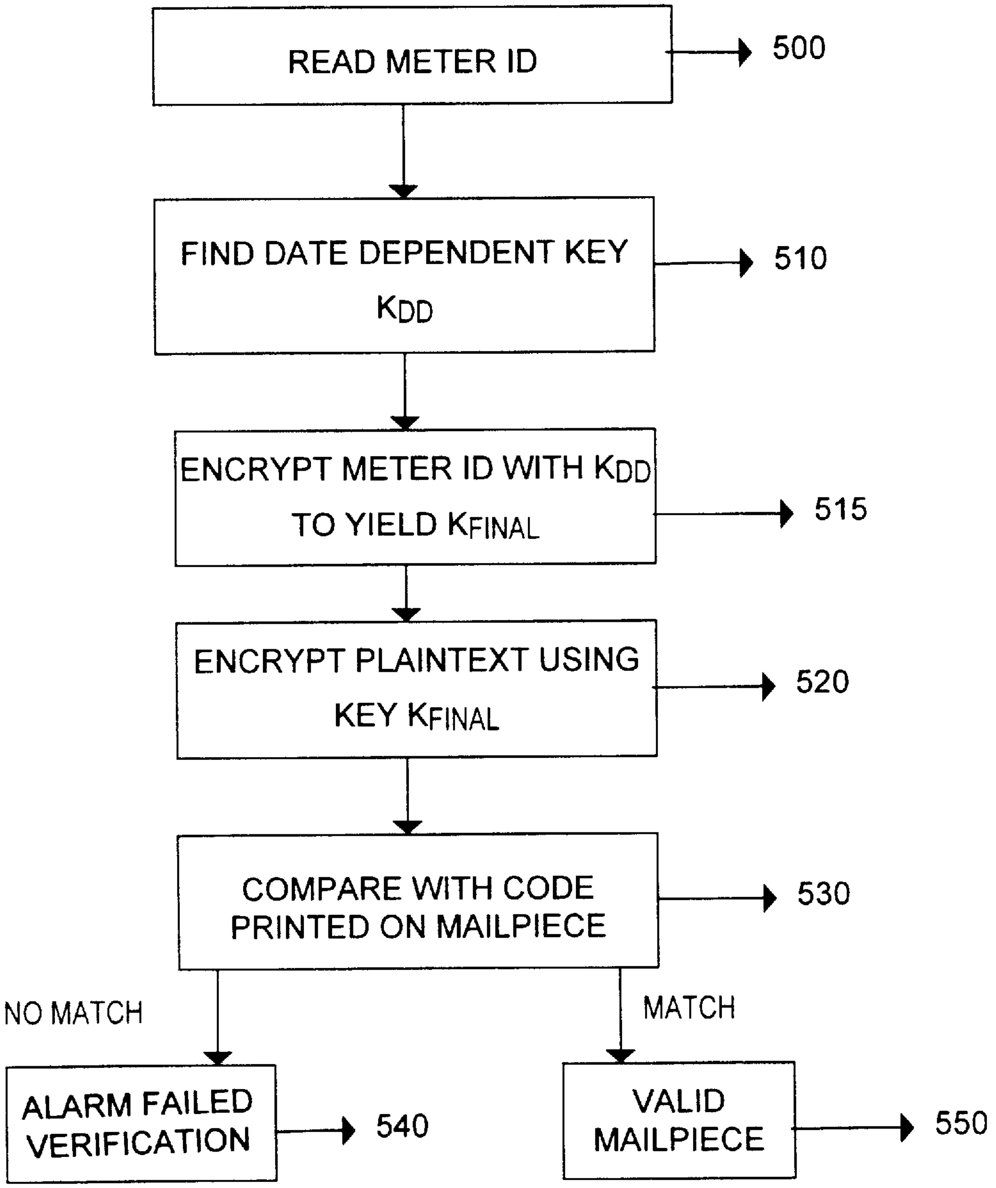
FIG. 8 is a flow chart of the verification process.

Referring now to FIG. 8, a verification process is shown using the key management system in accordance with the present invention. In order to verify a mailpiece, the meter ID number printed on the mailpiece is read at step 500. At step 510, using the meter ID number a date dependent key $K_{dd}$ is found in the table of $K_{dd}$'s distributed by the data center. The key is found using the lookup table or algorithm F from the given meter number. At step 515, the identical unique meter data that was used by the meter to obtain the meter's unique key $K_{final}$ is encrypted with the date dependent key $K_{dd}$. At step 520, the identical plaintext information used to create the ECODE is now encrypted at the security center using $K_{final}$, and the result is compared with the code printed on the mailpiece, at step 530. If there is a match at decision at step 540, the mailpiece is valid. If not the NO branch will trigger an alarm.

Returning for the moment to FIG. 2*a* and FIG. 3*a*, the Postal Service is able in these embodiments to obtain the PS-DES pointer directly from the indicia without using the process shown in FIG. 8. In the cases illustrated in FIGS. 2*b* and 3*b*, the DES pointer is obtained by using a predetermined algorithm applied to the information printed in the PED ID as described in connection with FIG. 8.

While the present invention has been disclosed and described with reference to the embodiments disclosed herein, it will be apparent that variations and modifications may be made therein. It is, thus, intended in the following claims to cover each variation and modification that falls within the true spirit and scope of the present invention.

What is claimed is:

1. A method for key management for controlling the keys used in encoding information to be printed on a mailpiece for validating the mailpiece, the method comprising the steps of:

generating a plurality of keys K to obtain a fixed key set $K_{pred(1-n)}$;

assigning one of said plurality of keys $K_{pred}$ to a particular postage meter M by means of a determined relationship associated with the postage meter, said relationship being derived as a predetermined function F(M) corresponding to the particular postage meter;

encrypting said assigned key $K_{pred}$ with a date to obtain an assigned date dependent key $K_{dd}$; and combining the assigned date dependent key $K_{dd}$ with information unique to the particular postage meter $M_{uni}$ to produce a final key $K_{final}$ for the particular postage meter M, such that $K_{final}=f(K_{dd}, M_{uni})$.

2. The method of claim 1 wherein said determined relationship associated with the postage meter is a pointer p associated with the particular postage meter M, said pointer p being derived as a function F(M) corresponding to predetermined parameters of the particular postage meter M.

3. The method of claim 1 further comprising the steps of:

encrypting a date with each $K_{pred}$ in said fixed key set $K_{pred(1-n)}$ to yield a table of date dependent keys $K_{dd(1-n)}$; and distributing said table of date dependent keys $K_{dd(1-n)}$ to verification sites.

4. A method for key management for controlling the keys used in encoding information to be printed on a mailpiece for validating the mailpiece, the method comprising the steps of:

generating a plurality of keys K to obtain a fixed key set $K_{pred(1-n)}$;

assigning one of said plurality of keys $K_{pred}$ to a particular postage meter M by means of a determined relationship associated with the postage meter, said relationship being derived as a predetermined function F(M) corresponding to the particular postage meter;

combining the assigned key $K_{pred}$ with information unique to the particular postage meter $M_{uni}$ to produce a final key $K_{final}$ for the particular postage meter M, such that $K_{final}=f(K_{pred}, M_{uni})$; and storing said final key $K_{final}$ in the particular postage meter M.

5. The method of claim 4 comprising the further steps of:

encrypting said final key $K_{final}$ with a date to obtain a date dependent key $K_{dd}$ for the particular meter M; and storing said date dependent key $K_{dd}$ in the particular meter M.

6. The method of claim 4 wherein said determined relationship associated with the postage meter is a pointer p associated with the particular postage meter M, said pointer p being derived as a function F(M) corresponding to predetermined parameters of the particular postage meter M.

7. A method for key management for controlling the keys used in encoding information to be printed on a mailpiece for validating the mailpiece, the method comprising the steps of:

generating a plurality of keys K to obtain a fixed key set $K_{pred(1-n)}$;

assigning one of said plurality of keys $K_{pred}$ to a particular postage meter M by means of a determined relationship associated with the postage meter, said relationship being derived as a predetermined function F(M) corresponding to the particular postage meter;

installing the assigned key $K_{pred}$ in the particular postage meter M;

encrypting said assigned key $K_{pred}$ with a date to obtain an assigned date dependent key $K_{dd}$; and combining the assigned date dependent key $K_{dd}$ with information unique to the particular postage meter $M_{uni}$ to produce a final key $K_{final}$ for the particular postage meter M, such that $K_{final}=f(K_{dd}, M_{uni})$.

8. A method for key management for controlling keys used in the verification of encoded information printed on a mailpiece, the method comprising the steps of:

generating a plurality of keys K to obtain a fixed key set $K_{pred(1-n)}$;

encrypting a date with each $K_{pred}$ in said fixed key set $K_{pred(1-n)}$ to yield a table of date dependent keys $K_{dd(1-n)}$;

distributing said table of date dependent keys $K_{dd(1-n)}$ to verification sites;

reading plaintext information printed on a mailpiece, said plaintext information including a meter ID identifying a particular postage meter M;

finding a date dependent key $K_{dd}$ corresponding to the particular postage meter M by means of a determined relationship associated with the postage meter, said relationship being derived as a predetermined function of said meter ID;

encrypting said meter ID with said date dependent key $K_{dd}$ to obtain a final key $K_{final}$;

encrypting at least some part of the plaintext information using said final key $K_{final}$ to obtain a code;

comparing said code with encoded information printed on the mailpiece; and validating the mailpiece when said code matches said encoded information.

* * * * *